No. 677,997. Patented July 9, 1901.
W. H. KOTHMANN.
PLOW.
(Application filed Nov. 23, 1900.)
(No Model.) 2 Sheets—Sheet 1.
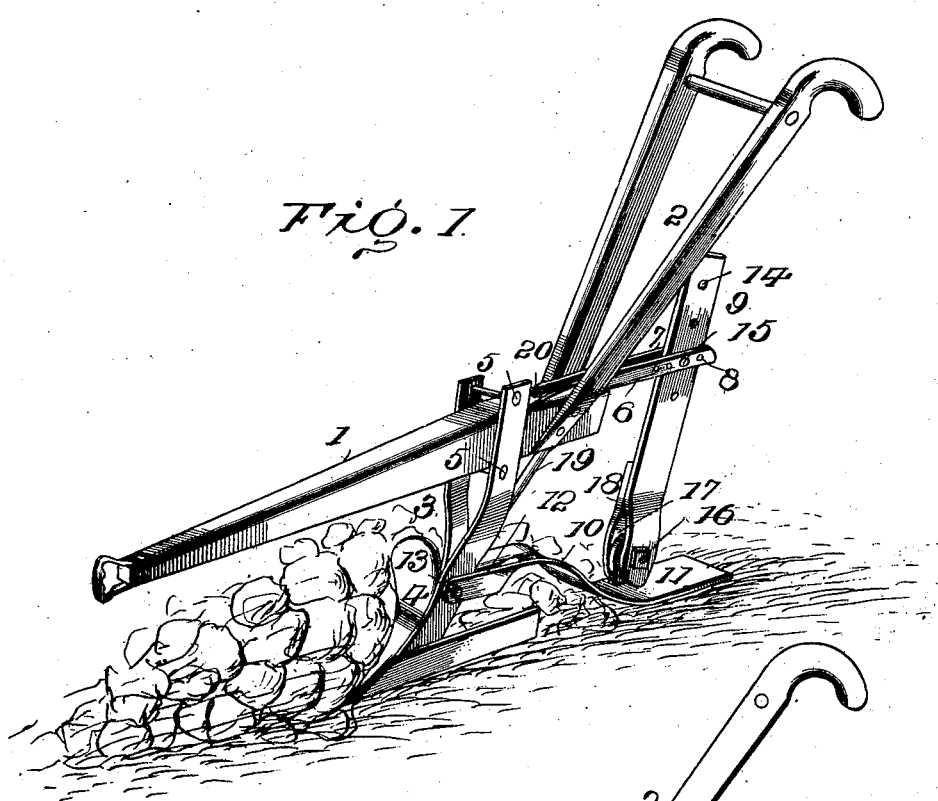
Witnesses
Jno. Innie
John F. Robb
Inventor
W. H. Kothmann
By R. H. A. Lacey, Attorneys
THE NORRIS PETERS CO., PHOTO-LITHO., WASHINGTON, D. C.

No. 677,997. Patented July 9, 1901.
W. H. KOTHMANN.
PLOW.
(Application filed Nov. 23, 1900.)
(No Model.) 2 Sheets—Sheet 2.
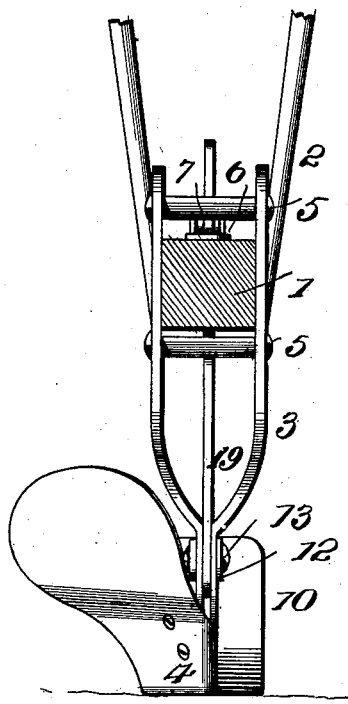
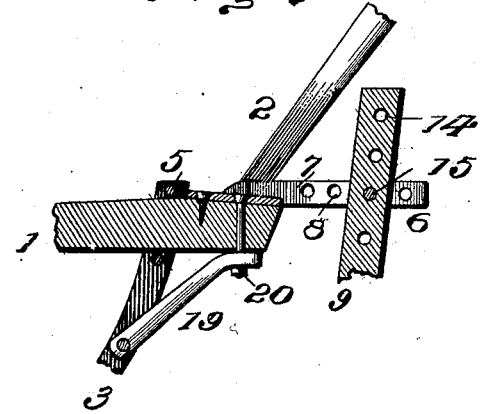
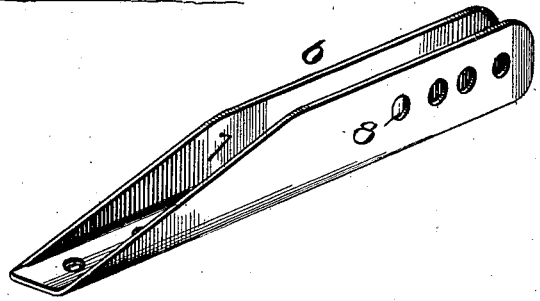
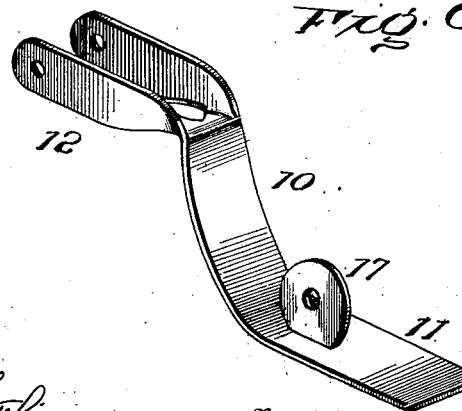
Witnesses
Inventor
W. H. Kothmann

UNITED STATES PATENT OFFICE.

WILLIAM H. KOTHMANN, OF FIELDCREEK, TEXAS.

PLOW.

SPECIFICATION forming part of Letters Patent No. 677,997, dated July 9, 1901.

Application filed November 23, 1900. Serial No. 37,494. (No model.)

*To all whom it may concern:*

Be it known that I, WILLIAM H. KOTHMANN, a citizen of the United States, residing at Fieldcreek, in the county of Llano and State of Texas, have invented certain new and useful Improvements in Plows; and I do hereby declare the following to be a full, clear, and exact description of the invention, such as will enable others skilled in the art to which it appertains to make and use the same.

This invention has relation to plows and like agricultural implements comprising a beam, a stock carrying a shovel or plow-point, and an adjustable runner for varying the depth of penetration of the said shovel.

The improvement relates to the peculiar construction of the gage-runner and adjunctive parts and the novel combination of the elements which hereinafter will be more fully set forth, illustrated, and claimed.

In the drawings hereto attached and forming a part of the specification, Figure 1 is a perspective view of a plow, showing the application of the invention. Fig. 2 is a side view, the dotted lines showing an adjusted position of the gage-runner. Fig. 3 is a section on the line X X of Fig. 2, looking to the rear. Fig. 4 is a detail longitudinal section of the rear portion of the plow. Fig. 5 is a perspective view of the gage-runner. Fig. 6 is a perspective view of the iron secured to the rear end of the beam and extended rearward therefrom.

Corresponding and like parts are referred to in the following description and indicated in all the views of the drawings by the same reference characters.

The plow selected and illustrated is typical of the class of agricultural implements to which the invention is adapted, and comprises the beam 1, handles 2, and stock or standard 3, provided with the shovel or plow-point 4. The stock or standard comprises companion members spaced apart and clamped at their upper ends against opposite sides of the beam 1 by transverse bolts 5.

An iron 6 is secured to the top side of the beam 1 and projects in the rear thereof and its rear portion is slotted or composed of spaced portions 7, having a series of transversely-alining openings 8. This iron is preferably formed of a blank of sheet metal folded upon itself and having the rear portion of the fold cut away to provide an unobstructed space between the parts 7 for the passage of the brace 9.

The gage-runner 10 comprises a rear portion 11, longitudinally curved, and a front portion composed of spaced arms 12, which are adapted to embrace the sides of the stock or standard 3, to which they are pivotally connected by the fastening 13. The parts 11 and 12 of the gage-runner are constructed by preference of a single strip of plate metal of proper gage and bent into the form substantially as shown. The front portion of the strip or blank is longitudinally slitted for a short distance from its front end, and the parts bordering upon the slit are given a quarter-twist, so as to bring them in a plane at a right angle to the major portion of the strip, whereby the arms 12 are formed. The rear portion of the gage-runner is adjustable vertically in an arcuate path and is adapted to be turned upon the pivot-fastening 13, and is secured in the adjusted position by fastening the upper end of the brace 9 to the rear portion of the iron 6. By adjusting the rear end of the gage-runner vertically the depth of penetration of the shovel or plow-point 4 can be regulated, and said shovel may be inclined more or less, according to the nature of the soil being worked.

The brace 9 has a series of openings 14 in its upper portion to receive the bolt or fastening 15, which is adapted to pass through any one of the openings 14 and 8 after the brace has been properly positioned and said openings have been made to coincide. The vertical adjustment of the brace 9 results in a rapid adjustment of the gage-runner, and a movement of said brace either in a forward or rearward direction provides for a nicety of adjustment not otherwise obtainable. The lower end of the brace 9 has pivotal connection with the rear portion 11 of the gage-runner by means of a fastening 16, passing through an opening at the lower end of said brace, a corresponding opening in a lug 17, applied to the runner, and a corresponding opening in a strap 18, secured to the lower portion of the said brace, the lug 17 coming between the brace and the said strap.

The stock or standard 3 is strengthened by means of a brace 19, which has its lower end fitted between the members of the said stock and mounted upon the bolt or fastening 13, the upper end of said brace being secured to the rear portion of the beam by a bolt 20, which is likewise utilized to secure the iron 6 in place.

The parts are of such construction as to admit of their ready application to any style of implement of the character of a plow substantially as shown, very little if any change being required to adapt the invention thereto.

Having thus described the invention, what is claimed as new is—

1. In a plow, a gage-runner having pivotal connection with the stock, and a brace pivoted to said gage-runner, an iron secured to the rear portion of the beam and composed of a sheet-metal blank doubled upon itself and having the rear portion of the fold cut away to provide a space for the reception of the upper end portion of the aforesaid brace, and means for adjustably connecting said brace with the iron, as and for the purpose set forth.

2. A gage-runner for plows and the like composed of a strip or blank of sheet metal having its front portion composed of spaced arms formed by slitting the said blank longitudinally for a short distance from its end and giving a quarter-twist to the parts bordering upon the said slit, substantially as set forth.

In testimony whereof I affix my signature in presence of two witnesses.

WILLIAM H. KOTHMANN. [L. S.]

Witnesses:
 JOHN McLEOD,
 R. H. BAUMANN.